(12) United States Patent
Shibata (10) Patent No.: US 11,018,363 B2
(45) Date of Patent: May 25, 2021

(54) FUEL CELL INCLUDING FRAME MEMBER

(71) Applicant: TOYOTA JIDOSHA KABUSHIKI KAISHA, Toyota (JP)

(72) Inventor: Kazunori Shibata, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 84 days.

(21) Appl. No.: 16/154,277

(22) Filed: Oct. 8, 2018

(65) Prior Publication Data

US 2019/0109342 A1   Apr. 11, 2019

(30) Foreign Application Priority Data

Oct. 11, 2017  (JP) .............................. JP2017-198048

(51) Int. Cl.

| | |
|---|---|
| *H01M 8/1004* | (2016.01) |
| *H01M 8/0284* | (2016.01) |
| *C09J 7/24* | (2018.01) |
| *B32B 27/08* | (2006.01) |
| *B32B 37/12* | (2006.01) |
| *C08J 5/22* | (2006.01) |
| *H01M 4/86* | (2006.01) |
| *H01M 8/0247* | (2016.01) |

(Continued)

(52) U.S. Cl.
CPC ........... *H01M 8/1004* (2013.01); *B32B 27/08* (2013.01); *B32B 37/12* (2013.01); *C08J 5/2206* (2013.01); *C09J 7/241* (2018.01); *H01M 4/8657* (2013.01); *H01M 8/0247* (2013.01); *H01M 8/0273* (2013.01); *H01M 8/0284* (2013.01); *H01M 8/242* (2013.01)

(58) Field of Classification Search
CPC ............. H01M 8/1004; H01M 8/0284; H01M 4/8657; H01M 8/0247; H01M 8/0273; H01M 8/242; H01M 8/028; C09J 7/241; B32B 27/08; B32B 37/12; C08J 5/2206
USPC ........................................................ 429/483
See application file for complete search history.

(56) References Cited

U.S. PATENT DOCUMENTS

| | | | |
|---|---|---|---|
| 2013/0183604 A1 | 7/2013 | Tanaka et al. | |
| 2016/0260993 A1* | 9/2016 | Ikeda | H01M 8/1004 |
| 2017/0162882 A1* | 6/2017 | Kawasumi | H01M 8/1004 |

FOREIGN PATENT DOCUMENTS

| | | |
|---|---|---|
| EP | 3 315 280 A1 | 5/2018 |
| JP | 2003-305809 | 10/2003 |

(Continued)

OTHER PUBLICATIONS

U.S. Appl. No. 16/154,298, filed Oct. 8, 2018.

*Primary Examiner* — Gary D Harris
(74) *Attorney, Agent, or Firm* — Finnegan, Henderson, Farabow, Garrett & Dunner, LLP (57) ABSTRACT

A fuel cell includes: a membrane-electrode-gas diffusion layer assembly; a separator positioned in one side with respect to the membrane-electrode-gas diffusion layer assembly; a frame member supporting the membrane-electrode-gas diffusion layer assembly and joined to the separator, wherein the frame member includes: a base layer; an adhesive layer having thermoplasticity, having a linear expansion coefficient greater than that of the base layer, and joining the base layer and the separator; and a coating, layer provided on a side, opposite to the adhesive layer, of the base layer, having a liner expansion coefficient greater than that of the base layer, and not containing an adhesive component.

7 Claims, 6 Drawing Sheets

(51) Int. Cl.
*H01M 8/0273* (2016.01)
*H01M 8/242* (2016.01)

(56) References Cited

FOREIGN PATENT DOCUMENTS

| JP | 2006-019204 | 1/2006 |
|----|-------------|--------|
| JP | 2013-168353 A | 8/2013 |
| JP | 2013-239316 | 11/2013 |
| JP | 2014-225335 | 12/2014 |
| JP | 2016-058161 A | 4/2016 |
| JP | 2017-013273 A | 1/2017 |

* cited by examiner

FUEL CELL INCLUDING FRAME MEMBER

CROSS-REFERENCE TO RELATED APPLICATION

This application is based upon and claims the benefit of priority of the prior Japanese Patent Application No. 2017-198048, filed on Oct. 11, 2017, the entire contents of which are incorporated herein by reference.

FIELD OF THE INVENTION

The present invention relates to a fuel cell.

BACKGROUND

A unit cell of a fuel cell includes a frame member supporting a membrane-electrode-gas diffusion layer assembly, and a pair of separators sandwiching the frame member. In joining the frame member and the pair of separators, a thermoplastic adhesive layer is provided on each surface of a base layer of the frame member, and then the frame member and the pair of separators are heated and pressed in a state where the pair of separators sandwich the frame member (See, for example, Japanese Unexamined Patent Application Publication No. 2014-225335).

Depending on the configuration of the unit cell, one of the separators may be joined to only one surface of the frame member. In this case, a thermoplastic adhesive layer is provided only on one surface of the base layer of the frame member. When these members are heated in joining the frame member and the separator, warpage might occur in the frame member due to a difference in linear expansion coefficient between the base layer and the adhesive layer. This might influence the sealing property between the frame member and the separator.

SUMMARY OF THE INVENTION

It is an object of the present invention to provide a fuel cell suppressing occurrence of warpage in a frame member.

The above object is achieved by a fuel cell including: a membrane-electrode-gas diffusion layer assembly; a separator positioned in one side with respect to the membrane-electrode-gas diffusion layer assembly; a frame member supporting the membrane-electrode-gas diffusion layer assembly and joined to the separator, wherein the frame member includes: a base layer; an adhesive layer having thermoplasticity, having a linear expansion coefficient greater than that of the base layer, and joining the base layer and the separator; and a coating layer provided on a side, opposite to the adhesive layer, of the base layer, having a liner expansion coefficient greater than that of the base layer, and not containing an adhesive component.

Since each of the linear expansion coefficients of the adhesive layer and the coating layer is greater than that of the base layer, each of the adhesive layer and the coating layer tend to expand with an expansion coefficient greater than that of the base layer, when the frame member and the separator are heated and joined. Herein, since the adhesive layer and the coating layer are provided on respective opposite sides of the base layer, the occurrence of warping in the frame member is suppressed. Additionally, "a coating layer not containing an adhesive component" does not mean only the coating layer from which the adhesive component has been completely removed, but includes a coating layer containing a small amount of the adhesive component which does not contribute to adhesion to another member.

The coating layer may have a liner expansion coefficient smaller than that of the adhesive layer, and the coating layer may be thicker than the adhesive layer.

The coating layer may have a liner expansion coefficient greater than that of the adhesive layer, and the coating layer may be thinner than the adhesive layer.

A gasket may be provided on the coating layer.

The fuel cell may include another separator joined to the separator.

The adhesive layer may be modified polyolefin including at least one polyolefin including a functional group.

The modified polyolefin may include: any one of or combination of acid anhydride including maleic anhydride; carboxylic acid including acrylic acid and methacrylic acid; alcohols including vinyl alcohol and ethylhexyl acrylate; silane coupling agent; epoxy resin; and urethane resin.

DETAILED DESCRIPTION

Figure 1:
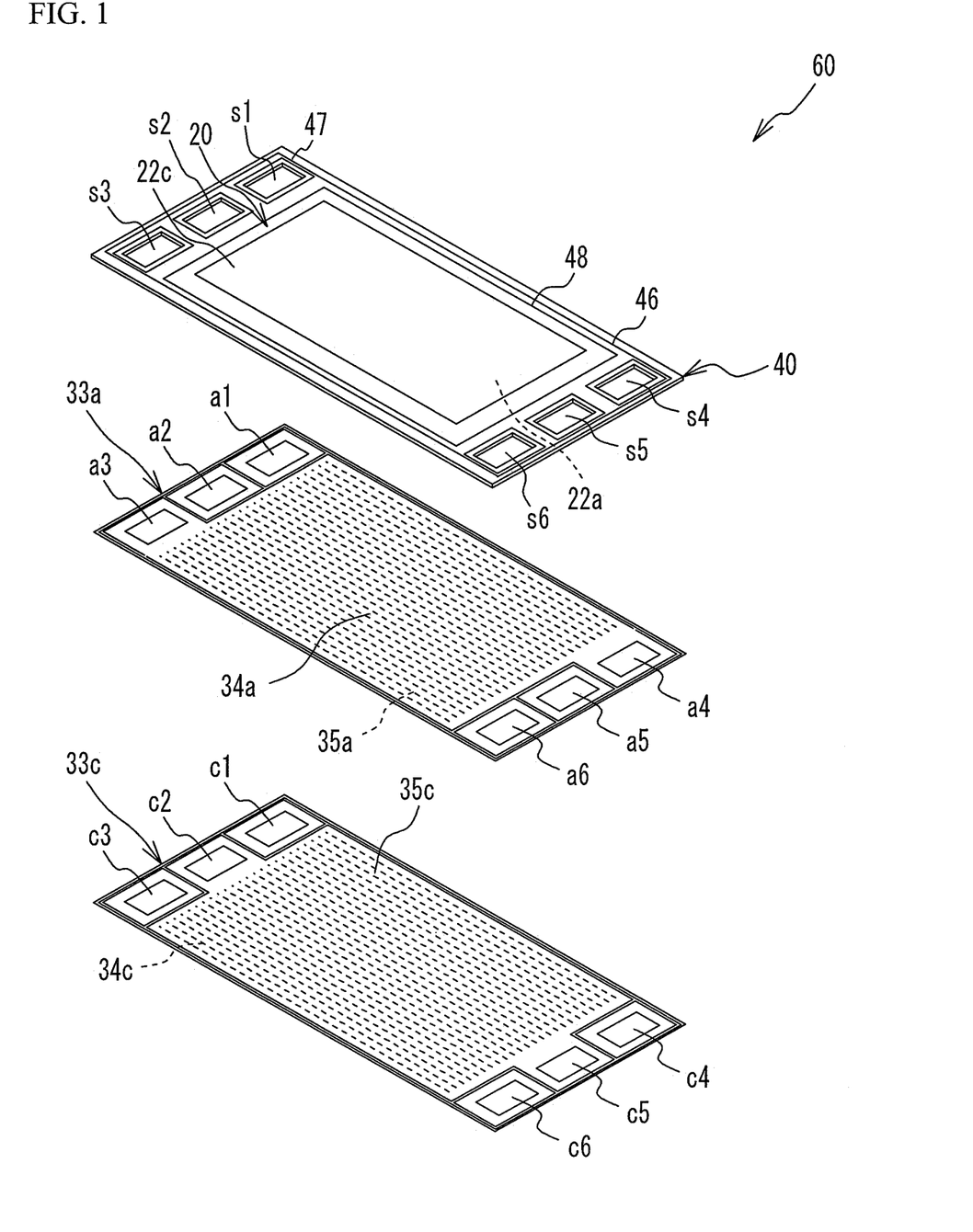
FIG. 1 is an exploded perspective view of a unit cell of a fuel cell.

FIG. 1 is an exploded perspective view of a unit cell 60 of a fuel cell. The fuel cell is configured by stacking the unit cells 60. This fuel cell is a polymer electrolyte fuel cell that generates electric power by receiving a fuel gas (for example, hydrogen) and an oxidizing gas (for example, oxygen) as reaction gases. The unit cell 60 includes a membrane-electrode-gas diffusion layer assembly 20 (hereinafter referred to as MEGA (Membrane Electrode Gas diffusion layer Assembly)) and an anode side separator 33a and a cathode side separator 33c (hereinafter referred to as a separator). The MEGA 20 includes an anode side gas diffusion layer 22a and a cathode side gas diffusion layer 22c (hereinafter referred to as a diffusion layer).

A frame member 40, made of resin, having an insulating property, is formed into a substantially frame shape. The outer peripheral edge of the frame member 40 is larger than the MEGA 20, and an inner peripheral edge is smaller than the electrolyte membrane 11 of the MEGA 20 and larger than the diffusion layer 22c. The MEGA 20 is joined to the inner peripheral edge side of the frame member 40. Holes s1 to s3 are formed along one of two short sides of the frame member 40, and holes s4 to s6 are formed along the other side. Likewise, holes a1 to a3 are formed along one of two short sides of the separator 33a, and holes a4 to a6 are formed along the other side. Holes c1 to c3 are formed along one of two short sides of the separator 33c, and holes c4 to c6 are formed along the other side. The holes s1, a1, and c1 communicate to one another and define a cathode inlet manifold. Likewise, the holes s2, a2 and c2 define a coolant outlet manifold. The holes s3, a3 and c3 define an anode outlet manifold. The holes s4, a4 and c4 define an anode inlet manifold. The holes s5, a5, and c5 define a coolant inlet manifold. The holes s6, a6, and c6 define a cathode outlet manifold.

A surface of the separator 33a facing the MEGA 20 is formed with anode flow paths 34a along which the fuel gas flows and which communicate between the anode inlet manifold and the anode outlet manifold. A surface of the separator 33a opposite to the anode flow path 34a, and a surface of the separator 33c facing the separator 33a are respectively formed with coolant flow paths 35a and 35c along which the coolant flows and which communicate between the coolant inlet manifold and the coolant outlet manifold. A surface of the separator 33c opposite to the coolant flow path 35c is formed with cathode flow paths 34c along which the oxidant gas flows and which communicate the cathode inlet manifold and the cathode outlet manifold. Additionally, the separators 33a and 33c are made of material with a gas barrier property and electro-conductivity, and may be made of a pressed stainless steel, a thin plate-shaped member made of metal such as titanium and titanium alloy, or a carbon member such as dense carbon.

Gaskets 46 to 48 are provided on the frame member 40. The gasket 46 has a frame shape along the outer peripheral edge of the frame member 40. The gaskets 47, each having a frame shape, are provided around the respective holes s1 to s6 and surround the respective holes s1 to s6. The gasket 48 has a frame shape surrounding the MEGA 20. The gaskets 46 to 48 are made of elastic rubber. The gaskets are not limited to the above configuration. For example, the gasket 47 may not be formed around the holes s3 and s4 respectively forming the cathode inlet manifold and the cathode outlet manifold, and the gasket 48 may not be provided. In another configuration, there may be provided a gasket 49 that entirely surrounds the MEGA 20 and the holes s3 and s4 respectively forming the cathode inlet manifold and the cathode outlet manifold, and the gaskets 46 and 48 may not be provided. With these configurations, the gaskets 47 can surround and seal the anode inlet manifold, the anode outlet manifold, the coolant inlet manifold, and the coolant outlet manifold, and the gaskets 46 and 47 or the gasket 49 can seal the cathode inlet manifold, the cathode outlet manifold, and the cathode flow path separated from the anode inlet manifold, the anode outlet manifold, the coolant inlet manifold, and the coolant outlet manifold. The gaskets 46 to 48 are separately formed and joined on the frame member 40, but not limited thereto. The frame member 40 and at least one of the gaskets 46 to 48 may be integrally formed and made of the same material or different materials.

Figure 2:
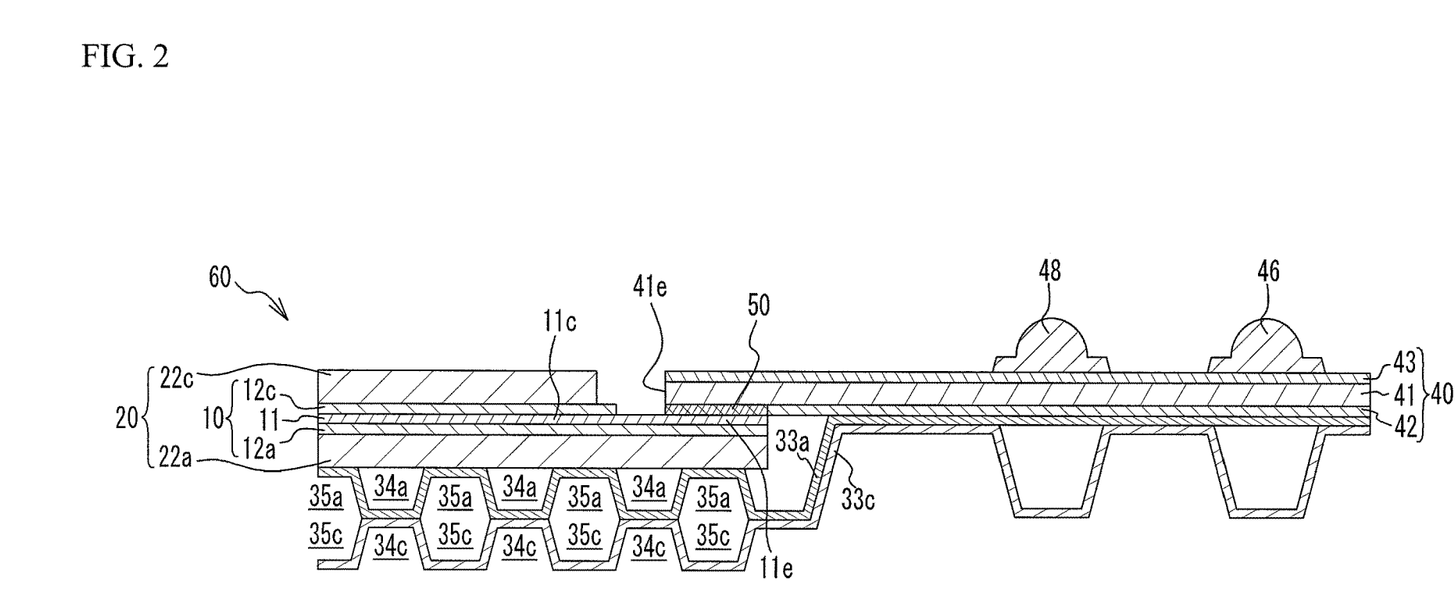
FIG. 2 is a partially cross-sectional view of the unit cell of the fuel cell.

FIG. 2 is a partially cross-sectional view of the unit cell 60. Specifically, FIG. 2 illustrates a part of a cross section perpendicular to the longitudinal direction of the unit cell 60. The MEGA 20 includes the above-described diffusion layers 22c and 22a and a membrane electrode assembly (hereinafter referred to as MEA) 10. The MEA 10 includes an electrolyte membrane 11 having a substantially rectangular shape, and a cathode side catalyst 12c and an anode side catalyst 12a (hereinafter referred to as a catalyst layer) respectively formed on an upper surface and a lower surface of the electrolyte membrane 11 in FIG. 2. The electrolyte membrane 11 is a solid polymer thin film, such as a fluorine-based ion exchange membrane, with high proton conductivity in a wet state. The electrolyte membrane 11 has a peripheral region 11e and a central region 11c surrounded by the peripheral region 11e.

The catalyst layer 12c is formed in the central region 11c on the upper surface of the electrolyte membrane 11 but not in the peripheral region 11e. The catalyst layer 12a is formed so as to substantially align its end with the end of the electrolyte membrane 11. That is, the catalyst layer 12a is formed substantially over the entire lower surface of the electrolyte membrane 11 including the peripheral region 11e and the central region 11c of the electrolyte membrane 11. The catalyst layers 12a and 12c are made by coating a catalyst ink containing a carbon support carrying platinum (Pt) or the like and an ionomer having proton conductivity on the electrolyte membrane 11.

The diffusion layers 22c and 22a are joined to the catalyst layers 12c and 12a, respectively. The diffusion layers 22c and 22a are made of a material having gas permeability and electro-conductivity, for example, a porous fiber base material such as carbon fiber or graphite fiber. The diffusion layer 22c is provided so as to position an end thereof slightly inwardly from the end of the catalyst layer 12c or to substantially align the end of the diffusion layer 22c therewith. Thus, the diffusion layer 22c is provided so as to overlap the central region 11c of the electrolyte membrane 11 through the catalyst layer 12c but not to overlap the peripheral region 11e. Accordingly, the diffusion layer 22c is provided so as to expose the peripheral region 11e.

Likewise, the diffusion layer 22a is provided so as to substantially align its end with an end of the catalyst layer 12a, and the catalyst layer 12a is formed substantially over the entire lower surface of the electrolyte membrane 11 as described above. Therefore, the diffusion layer 22a is provided so as to overlap not only the central region 11c but also the peripheral region 11e through the catalyst layer 12a. Since the diffusion layer 22a is provided so as to also overlap the peripheral region 11e in such a way, the MEA 10 is stably supported.

The frame member 40 is a member for preventing cross leak and electrical short circuit between catalyst electrodes. The frame member 40 includes a base layer 41 having a frame shape and made of resin, an adhesive layer 42 provided on a lower surface of the base layer 41 in FIG. 2, and a coating layer 43 provided on an upper surface of the base layer 41. The separator 33a is joined to the lower surface of the base layer 41 by the adhesive layer 42. The adhesive layer 42 and the coating layer 43 are thermoplastic resins, but the adhesive layer 42 contains an adhesive component, and the coating layer 43 does not contain any adhesive component. Also, the base layer 41 does not contain any adhesive component. The adhesive layer 42 and the coating layer 43 each has a frame shape, like the base layer 41. The adhesive layer 42 and the coating layer 43 have substantially the same area and the same thickness. The gaskets 46 to 48 are provided on the coating layer 43.

The separator 33c is joined to the other side of the separator 33a opposite to one side thereof to which the base layer 41 is joined. Further, the lower surface of the base layer 41 in an inner peripheral edge 41e side is joined to the peripheral region 11e of the electrolyte membrane 11 with the adhesive layers 50 and 42. In the region of the lower surface of the base layer 41 joined to the peripheral region 11e, the adhesive layer 50 and the adhesive layer 42 are mixed. The adhesive layer 50 is an ultraviolet curable resin. In this way, the frame member 40 supports the MEGA 20 and is joined to the separator 33a. The separator 33a is positioned in one side with respect to the MEGA 20.

The unit cells 60 are stacked to configure the fuel cell. Thus, in the fuel cell, the MEGA 20 and the frame member 40 illustrated in FIG. 2 are sandwiched between the illustrated separator 33a and a cathode separator of non-illustrated another unit cell adjacent to the upper side of the unit cell 60 of FIG. 2. Further, an MEGA and a frame member of another non-illustrated unit cell adjacent to the lower side of the unit cell 60 of FIG. 2 are sandwiched between the anode separator of this non-illustrated unit cell and the separator 33c of FIG. 2. Furthermore, the gaskets 46 to 48 are compressed by a cathode separator of the other non-illustrated unit cell adjacent to the upper side of the unit cell 60.

Figure 3:
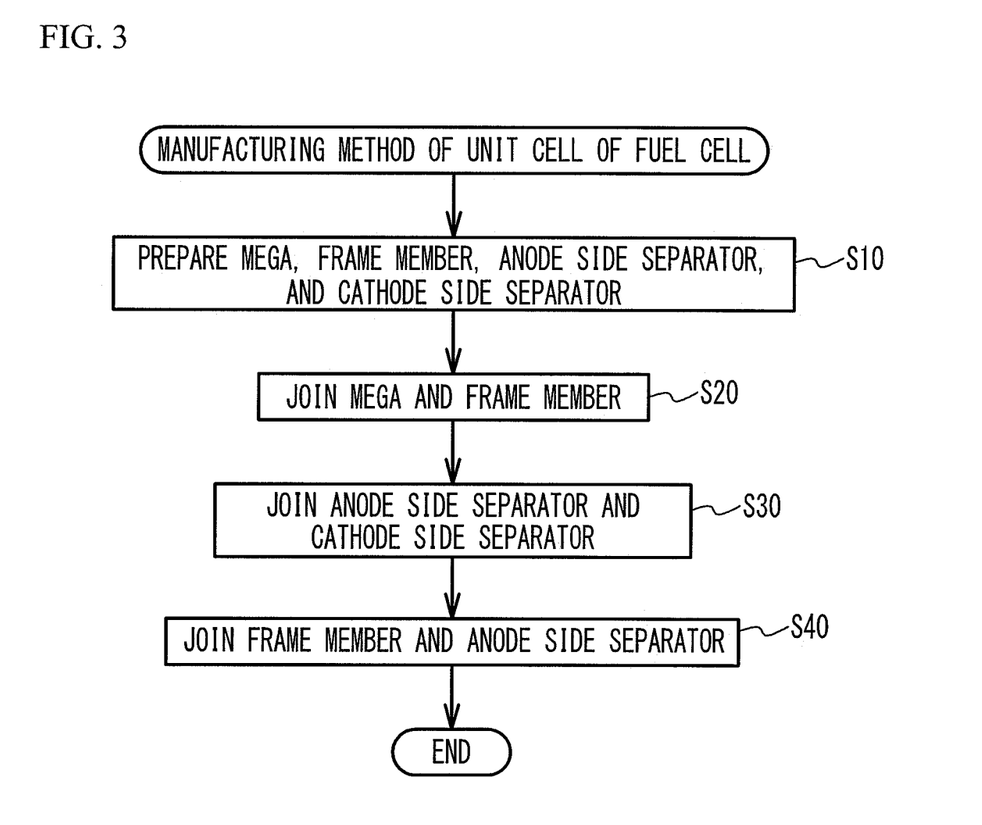
FIG. 3 is a flowchart illustrating a manufacturing method of the unit cell.

Next, a manufacturing method of the unit cell 60 will be described. FIG. 3 is a flowchart illustrating the manufacturing method of the unit cell 60. FIGS. 4A to 4D are explanatory views of the manufacturing method of the unit cell 60. Firstly, the MEGA 20, the frame member 40, and the separators 33a and 33c are prepared (step S10).

Figure 4A:
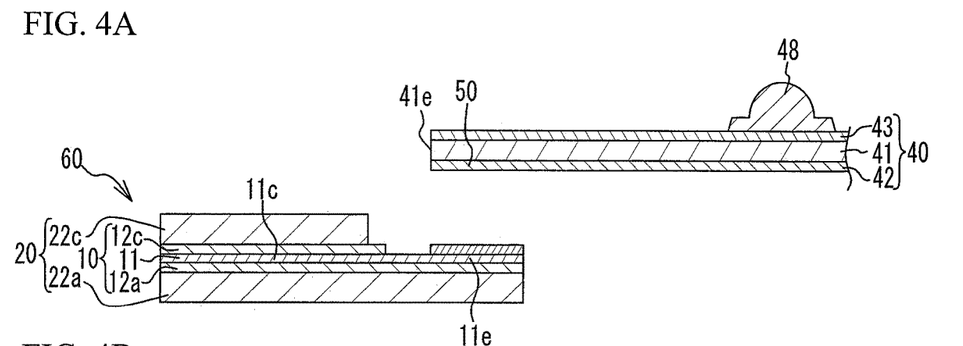
FIGS. 4A to 4D are explanatory views of the manufacturing method of the unit cell.
Figure 4B:
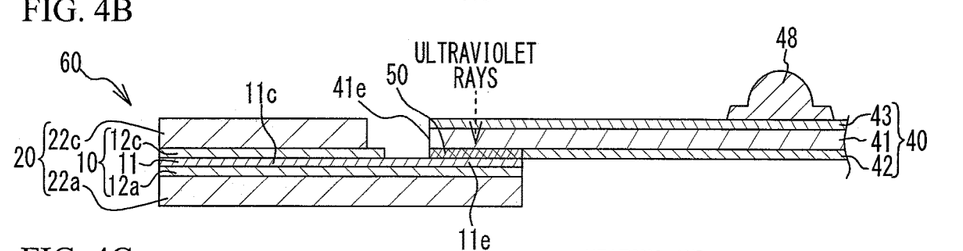

Next, the peripheral region 11e of the electrolyte membrane 11 of the MEGA 20 and the lower surface in the inner peripheral edge 41e side of the base layer 41 are joined with the adhesive layer 50 (step S20). Specifically, the lower surface of the base layer 41 of the frame member 40 in the inner peripheral edge 41e side is brought into contact with the adhesive layer 50 that is applied on the peripheral region 11e by a dispenser or the like, and then ultraviolet rays irradiated from the upper side of the frame member 40 to the peripheral region 11e, thereby curing the adhesive layer 50 and joining the frame member 40 to the MEGA 20. Herein, the frame member 40 is made of a material having ultraviolet transparency. Further, the adhesive layer 50 mixed with the adhesive layer 42 is cured on the inner peripheral edge 41e side of the base layer 41.

Figure 4C:
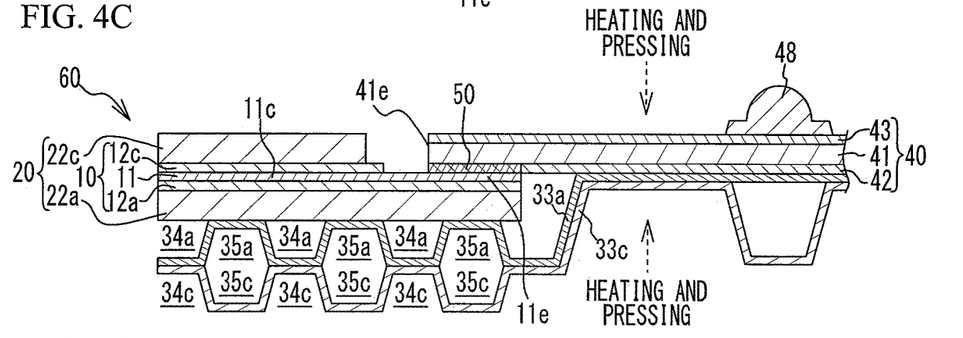
Figure 4D:
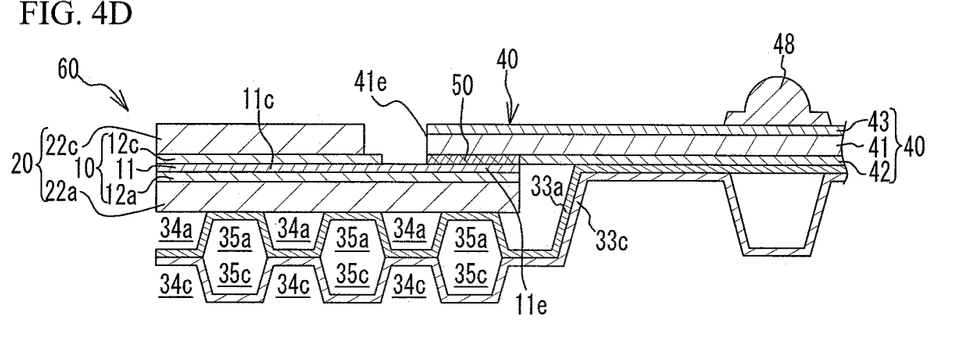

Next, the separators 33c and 33a are joined by adhesion or welding (step S30). Next, the frame member 40 and the separator 33a are joined to each other with the adhesive layer 42 (step S40). Specifically, in a state where the base layer 41 of the frame member 40 and the separator 33a are in contact with each other through the adhesive layer 42, the frame member 40 and the separators 33a and 33c are heated and pressed by hot pressing dies as illustrated in FIG. 4C. Accordingly, the adhesive layer 42 melt. After that, the heating is stopped and the adhesive layer 42 is cooled and cured, and then the pressure is released, so that the frame member 40 and the separator 33a are joined to each other as illustrated in FIG. 4D. Additionally, since the coating layer 43 does not contain any adhesive component as described above, the coating layer 43 is suppressed from adhering to a hot pressing die in heating and pressing. Also, the inner peripheral edge 41e side of the lower surface of the base layer 41 is joined to the peripheral region 11e of the electrolyte membrane 11 with the adhesive layers 42 and 50. In addition, the order of the steps S30 and S40 may be reversed. In a case of performing step S30 after step S40, the separators 33c and 33a are joined to each other by adhesion or welding at a temperature equal to or lower than the melting temperature of the adhesive layer 42 in step S30.

Further, the base layer 41 of the frame member 40 is made of a material having a relatively low linear expansion coefficient in order to suppress the thermal expansion in the heating step described above. For example, the material of the base layer 41 of the frame member 40 is PEN (polyethylene naphthalate), PET (polyethylene terephthalate), PPS (polyphenylene sulfide), SPS (syndiotactic polystyrene), COC (cyclic olefin copolymer) or the like. In contrast, the material of the adhesive layer 42 has a linear expansion coefficient greater than that of the material of the base layer 41. Specifically, the adhesive layer 42 is modified polyolefin including at least one polyolefin including a functional group. Specifically, the modified polyolefin preferably includes: any one of or combination of silane coupling agent; epoxy resin; urethane resin; acid anhydride including maleic anhydride; carboxylic acid including acrylic acid and methacrylic acid; and alcohols including vinyl alcohol and ethylhexyl acrylate. For example, maleic acid-modified polypropylene can be used. Polyolefin is usually nonpolar and difficult to adhere to a metal. However, polyolefin is polar by incorporating the above additive thereinto, and adhesion to a metal is improved. The material of the coating layer 43 has a liner expansion coefficient greater than that of the base layer 41. Specifically, the coating layer 43 is a polyolefin such as polypropylene, polyethylene or the like not added with an additive such as a silane coupling agent.

Figure 5A:
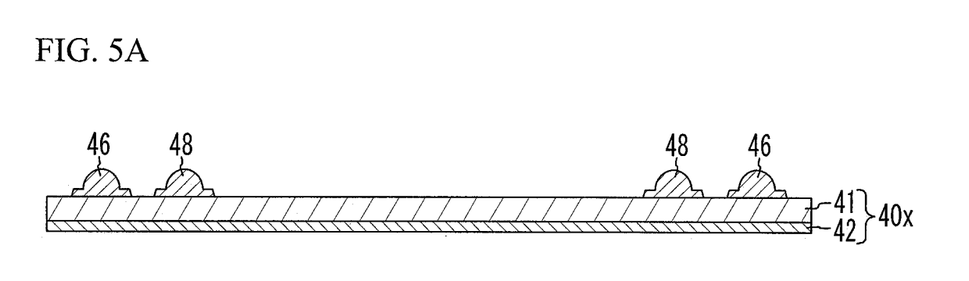
FIGS. 5A and 5B are explanatory views of a comparative example.
Figure 5B:
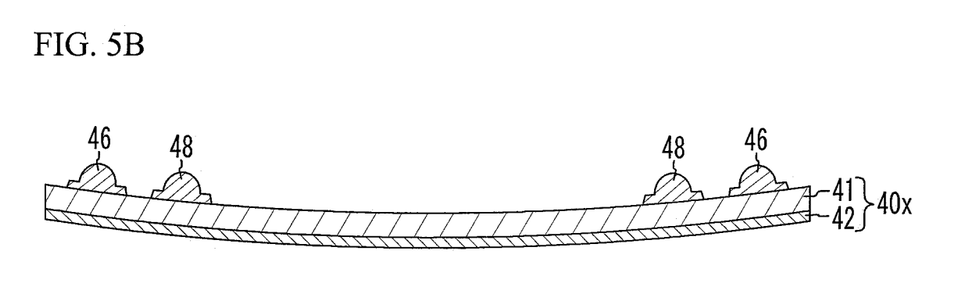

Next, a frame member 40x according to a comparative example will be described. FIGS. 5A and 5B are explanatory views of the frame member 40x according to the comparative example. Unlike the frame member 40, the frame member 40x is not provided with the coating layer 43. By using such a frame member 40x, the base layer 41 of the frame member 40 and the separator 33a are joined with the adhesive layer 42. In heating the base layer 41 and the separator 33a brought into contact with each other through the adhesive layer 42, warpage might occur in the frame member 40x due to the difference in expansion coefficient caused by the difference in linear expansion coefficient between the base layer 41 and the adhesive layer 42, as illustrated in FIG. 5B. If the adhesive layer 42 melts in such a state and then joins the base layer 41 and the separator 33a, the frame member 40x in which warpage occurs might be joined to the separator 33a. Moreover, the internal stress might remain in the base layer 41, after the frame member 40x and the separator 33a are joined to each other. This might not suitably ensure the sealing property between the base layer 41 and the separator 33a.

In the present embodiment, the coating layer 43 is formed on the surface, opposite to the adhesive layer 42, of the base layer 41. Like the adhesive layer 42, the coating layer 43 has a linear expansion coefficient greater than that of the base layer 41 as described above. When these layers are heated, not only the adhesive layer 42 but also the coating layer 43 tend to expand with an expansion coefficient higher than that of the base layer 41 in the planar direction. That is, each of the adhesive layer 42 and the coating layer 43 tend to expand with an expansion coefficient higher than that of the base layer 41 in the planar direction. This reduces the difference in expansion coefficient between the adhesive layer 42 and the coating layer 43, thereby suppressing the occurrence of warpage in the frame member 40. It is thus possible to join the base layer 41 in a flat state to the separator 33a, and to ensure the sealing property between the base layer 41 and the separator 33a.

In the present embodiment, the adhesive layer 50 is an ultraviolet curable resin, but not limited thereto, and it may be a thermoplastic resin. In this case, without using an adhesive layer of different type from the adhesive layer 42, only the inner peripheral edge side of the adhesive layer 42 may be melted by heating only the inner peripheral edge 41e side of the frame member 40 facing the peripheral region of the MEGA 20, which may join the MEGA 20 and the frame member 40 to each other. At this time, joining may be performed while the outer peripheral region is cooled so as not to heat the outer peripheral region excluding the inner peripheral edge 41e side of the frame member 40. Further, the adhesive layer 50 may be a thermosetting resin. Also in this case, the thermosetting resin having a curing temperature lower than the melting point of the adhesive layer 42 is used as the adhesive layer 50, in order that the adhesive layer 42 does not melt in the heating and joining of the MEGA 20 and the frame member 40.

In the above embodiment, only the joining of the frame member 40 and the separator 33a has been described as an example of the step of heating the frame member 40, but the present invention is not limited thereto. For example, in a case where the adhesive layer 50 is a thermoplastic resin or a thermosetting resin as described above, the frame member 40 is also heated when the MEGA 20 and the frame member 40 are joined. Also, in a case where the adhesive layer 50 is an ultraviolet curable resin, when a material absorbing ultraviolet rays is present at a part to which ultraviolet rays are irradiated, heat might be generated. Further, in a case where a gasket or the like is joined on the coating layer 43 with an adhesive bond which is a thermoplastic resin or a thermosetting resin, the frame member 40 is also heated. As described above, even in a case of heating the frame member 40 several times in the manufacturing process of the unit cell 60, the occurrence of warpage in the frame member 40 is suppressed. This facilitates handling of the frame member 40 in the manufacturing process, and also suppresses a decrease in productivity.

The coating layer 43 does not contain any adhesive component as described above, but may contain a small amount of an adhesive component so as not to contribute to adhesion with another member. Further, in a state where the unit cells 60 are stacked, the coating layer 43 is not joined to a separator of another adjacent unit cell. Additionally, the frame member 40 is manufactured as follows: an adhesive layer is provided on one surface of the base layer having a plate shape by screen printing or transfer. Next, a coating layer is provided on the other surface in the same manner. After that, these layers are cut into a frame shape and the holes s1 to s6 are formed therein by punching.

From the viewpoint of suppressing the occurrence of warpage in the frame member, it is preferable that the adhesive layer and the coating layer are made of the same material having the same linear expansion coefficient and are the same size and the same thickness. However, for various reasons, it is consider to use materials of the adhesive layer and the coating layer differing from each other in linear expansion coefficient. Hereinafter, a description will be given of variations in which materials of the adhesive layer and the coating layer differ from each other in linear expansion coefficient.

Figure 6A:
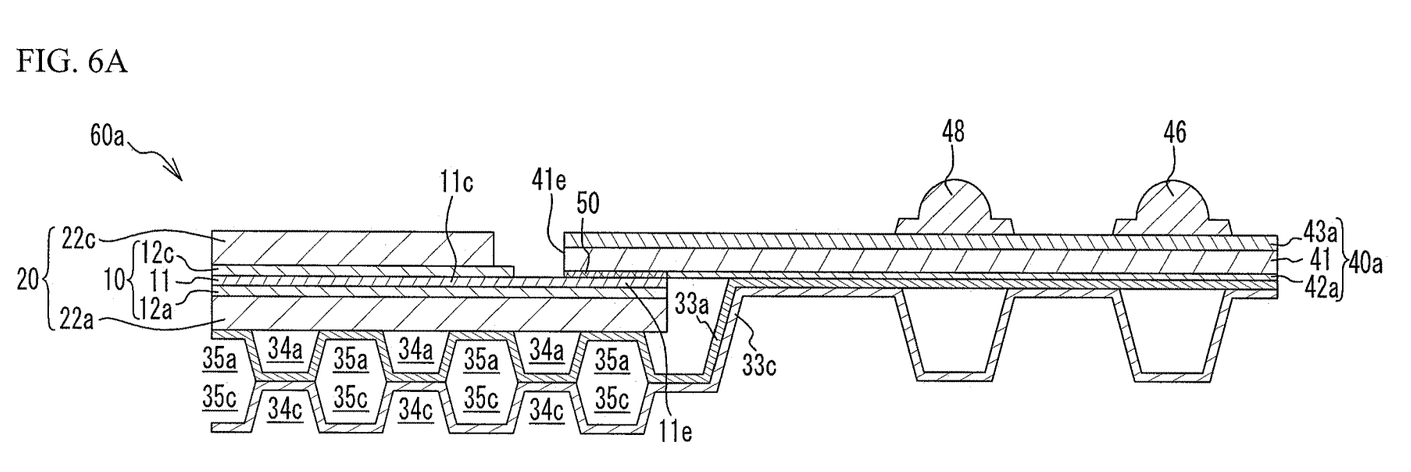
FIGS. 6A and 6B are partially cross-sectional views of unit cells according to variations.

FIG. 6A is a partially cross-sectional view of a unit cell 60a according to the variation. In addition, the same components are denoted by the same reference numerals, and a duplicated explanation is omitted. In a frame member 40a of the unit cell 60a, a coating layer 43a is made of a material having a linear expansion coefficient smaller than that of an adhesive layer 42a. Also, the coating layer 43a is formed thicker than the adhesive layer 42a. Herein, assuming that the coating layer 43a has a linear expansion coefficient smaller than that of the adhesive layer 42a and they are the same thickness, when the frame member 40a is heated, the adhesive layer 42a expands more than the coating layer 43a, and then warpage occurs in the frame member 40a so as to be convex toward the adhesive layer 42a. However, the coating layer 43a is actually thicker than the adhesive layer 42a. Thus, as compared with the above assumed case, the force exerting on the base layer 41 due to the expansion of the coating layer 43a is increased to reduce the difference between the force exerting on the base layer 41 due to the expansion of the adhesive layer 42a and the force exerting on the base layer 41 due to the expansion of the coating layer 43a, and then the occurrence of warpage in the frame member 40a is suppressed.

Figure 6B:
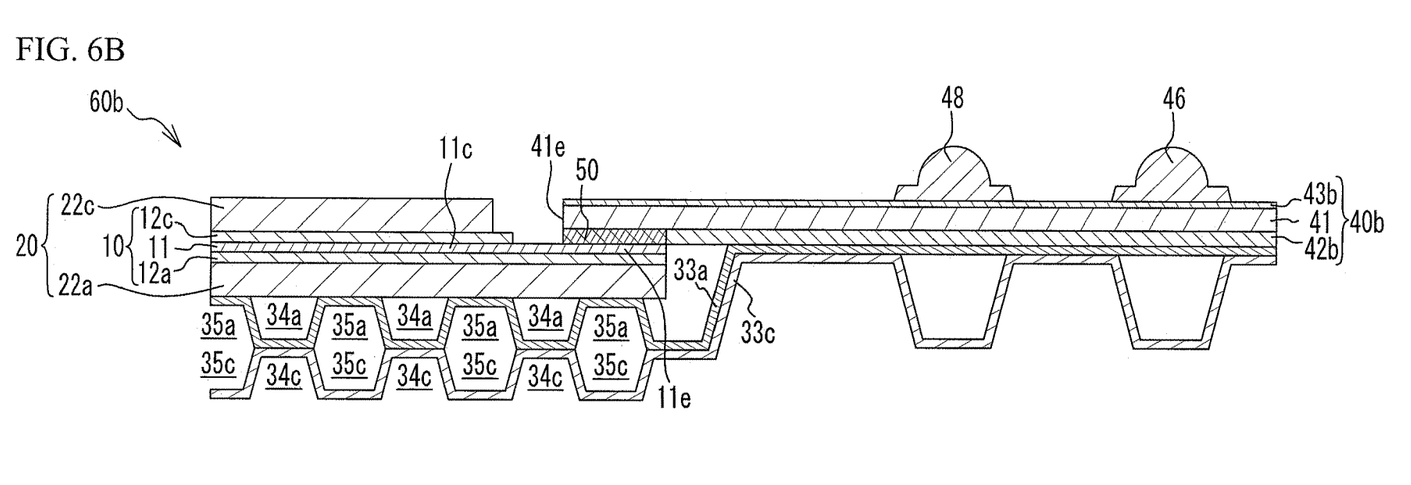

FIG. 6B is a partially cross-sectional view of a unit cell 60b of the variation. In a frame member 40b of the unit cell 60b, a coating layer 43b is made of a material having a linear expansion coefficient greater than that of an adhesive layer 42b. In addition, the coating layer 43b is formed thinner than the adhesive layer 42b. Here, assuming that the coating layer 43b has a linear expansion coefficient greater than that of the adhesive layer 42b and they are the same thickness, when the frame member 40b is heated, the coating layer 43b expands more than the adhesive layer 42b, and then warpage occurs in the frame member 40b so as to be convex toward the coating layer 43b. However, the coating layer 43b is actually thinner than the adhesive layer 42b. Thus, as compared with the above assumed case, the force exerting on the base layer 41 due to the expansion of the coating layer 43b is decreased to reduce the difference between the force exerting on the base layer 41 due to the expansion of the adhesive layer 42b and the force exerting on the base layer 41 due to the expansion of the coating layer 43b, and then the occurrence of warp of the frame member 40b is suppressed.

In such above variations, in the case of using materials of the adhesive layer and the coating layer differing from each other in linear expansion coefficient, it is possible to suppress the occurrence of warpage in the frame member by changing both thicknesses. For example, since the courting layer does not need to adhere to another member and does not need to melt in the manufacturing process, a material having a higher melting point than that of the adhesive layer can be used as the material of the coating layer. This facilitates handling of the frame member in the manufacturing process. Further, even in a case where a material less expensive than that of the adhesive layer is used as the material of the coating layer with priority given to the manufacturing cost, the occurrence of warp of the frame member can be suppressed by changing the thicknesses of the adhesive layer and the coating layer as described above. Furthermore, when the unit cells are stacked, the coating layer is pressed against a separator of another adjacent unit cell. Herein, even in a case where a material having a frictional coefficient greater than that of the material of the adhesive layer or a material having an elastic coefficient greater than that of the material of the adhesive layer is used as the material of the coating layer in order to suppress positional displacement of the unit cell in the planar direction in a state where the unit cells are stacked, the occurrence of warpage in the frame member can be suppressed.

The above embodiment and variations exemplary describe the MEGA 20 in which the outer peripheral shape of the diffusion layer 22c is smaller than that of the diffusion layer 22a and in which the catalyst layer 12c and the diffusion layer 22c are provided so as to expose the peripheral region 11e of the electrolyte membrane 11. However, the MEGA 20 is not limited thereto. For example, the outer peripheral shape of the anode side diffusion layer may be smaller than that of the cathode side diffusion layer and the anode catalyst layer and the anode side gas diffusion layer may be provided so as to expose the peripheral region of the electrolyte membrane.

Although some embodiments of the present invention have been described in detail, the present invention is not limited to the specific embodiments but may be varied or changed within the scope of the present invention as claimed.

What is claimed is:

1. A fuel cell comprising:
   a membrane-electrode-gas diffusion layer assembly;
   a separator positioned in one side with respect to the membrane-electrode-gas diffusion layer assembly;
   a frame member supporting the membrane-electrode-gas diffusion layer assembly and joined to the separator,
   wherein the frame member includes:
   a base layer;
   an adhesive layer having thermoplasticity, having a linear expansion coefficient greater than that of the base layer, and joining the base layer and the separator; and
   a coating layer provided on a side, opposite to the adhesive layer, of the base layer, having a liner expansion coefficient greater than that of the base layer, and not containing an adhesive component.

2. The fuel cell of claim 1, wherein
   the coating layer has a liner expansion coefficient smaller than that of the adhesive layer, and
   the coating layer is thicker than the adhesive layer.

3. The fuel cell of claim 1, wherein
   the coating layer has a liner expansion coefficient greater than that of the adhesive layer, and
   the coating layer is thinner than the adhesive layer.

4. The fuel cell of claim 1, wherein a gasket is provided on the coating layer.

5. The fuel cell of claim 1, further comprising another separator joined to the separator.

6. The fuel cell of claim 1, wherein the adhesive layer is modified polyolefin including at least one polyolefin including a functional group.

7. The fuel cell of claim 6, wherein the modified polyolefin includes: any one of or combination of acid anhydride including maleic anhydride; carboxylic acid including acrylic acid and methacrylic acid; alcohols including vinyl alcohol and ethylhexyl acrylate; silane coupling agent; epoxy resin; and urethane resin.

* * * * *